United States Patent [19]

Frederick et al.

[11] Patent Number: 4,888,739
[45] Date of Patent: Dec. 19, 1989

[54] FIRST-IN FIRST-OUT BUFFER MEMORY WITH IMPROVED STATUS FLAGS

[75] Inventors: Bruce Frederick, Los Gatos; Paul Keswick, San Jose, both of Calif.

[73] Assignee: Cypress Semiconductor Corporation, San Jose, Calif.

[21] Appl. No.: 207,249

[22] Filed: Jun. 15, 1988

[51] Int. Cl.$^4$ .................. G11C 7/00; G11C 19/00
[52] U.S. Cl. .................................. 365/221; 365/78; 365/189.05
[58] Field of Search ............ 365/73, 76, 78, 221, 365/189.05

[56] References Cited

U.S. PATENT DOCUMENTS 4,694,426  9/1987  Mason ............................. 365/78 X

OTHER PUBLICATIONS

Computer Design, Aug. 1, 1986, pp. 109–112, "FIFO RAM Controller Tackles Deep Data Buffering", by Tom Pai.
"FIFO-The Glue Holding Systems Together", by Ching-Lin Jiang and Michael Bolan, pp. 181–189, Computer Design Magazine, Jun. 1983.

Primary Examiner—A. J. Heinz
Assistant Examiner—Alfonso Garcia
Attorney, Agent, or Firm—Blakely, Sokoloff, Taylor & Zafman

[57] ABSTRACT

A first-in first-out buffer memory with improved status flags to indicate not only memory empty and memory full conditions, but to further indicate conditions such as almost empty, almost full and half-full is disclosed. To generate the flags, counters continuously count the number of write and read operations, with a subtractor coupled thereto providing as an output the difference between the two counts. Time delay circuits initiated by write or read operations provide time delays sufficient to enable the counters and the subtractor to settle before clocking the result into a latch. The output of the latch is decoded, with a further time delay circuit clocking the decoder output thereinto to provide output signals for the foregoing status flags. The use of the time delay circuits and the clocking of status flags avoids any significant flag invalid time, making the flag signals constantly monitorable without regard to the timing of read and write operations.

8 Claims, 3 Drawing Sheets

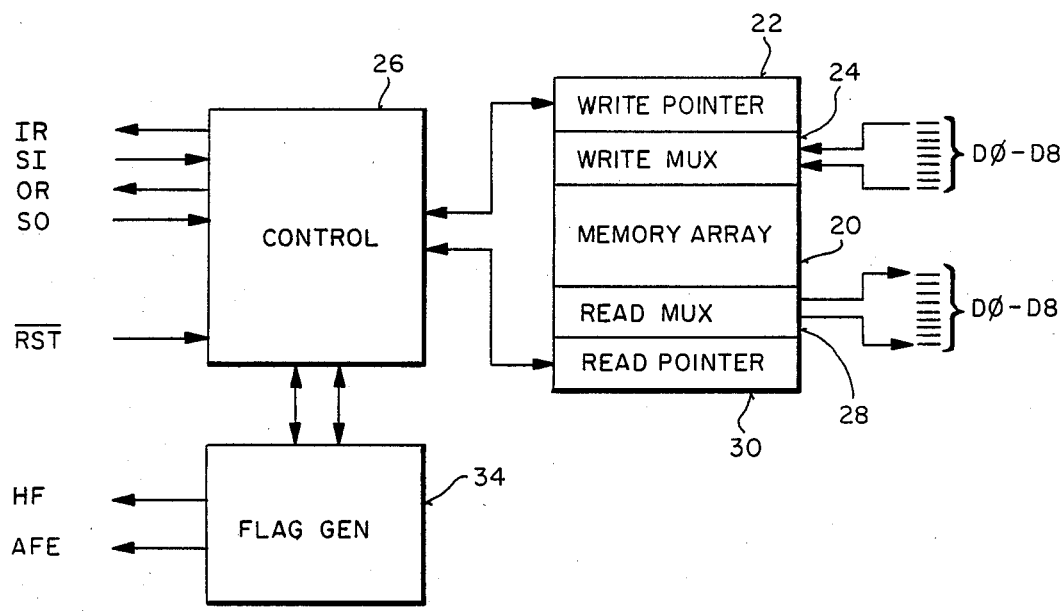
FIG_1
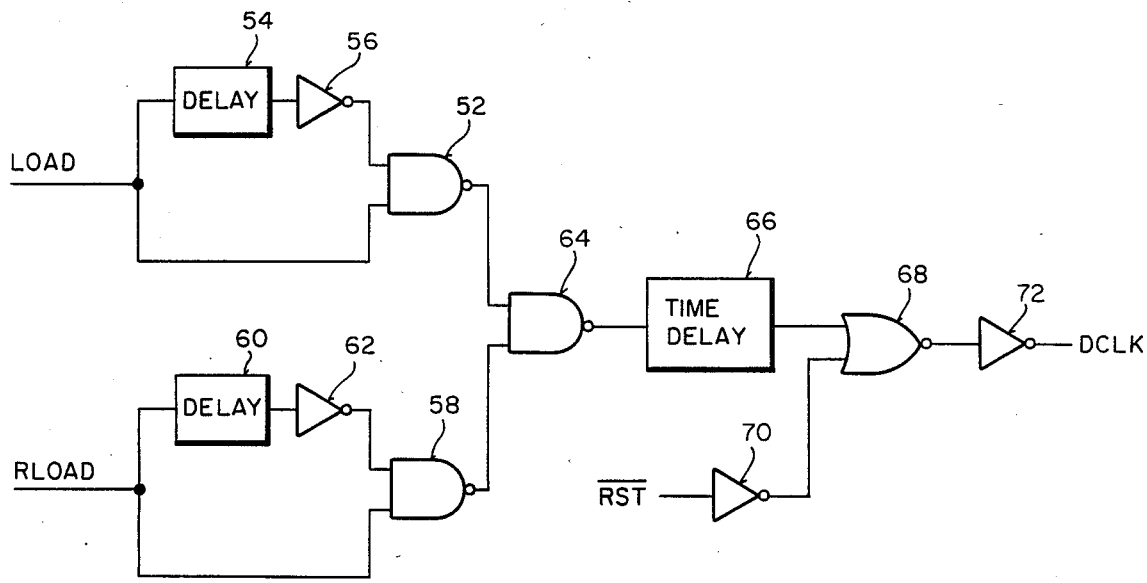
FIG_3

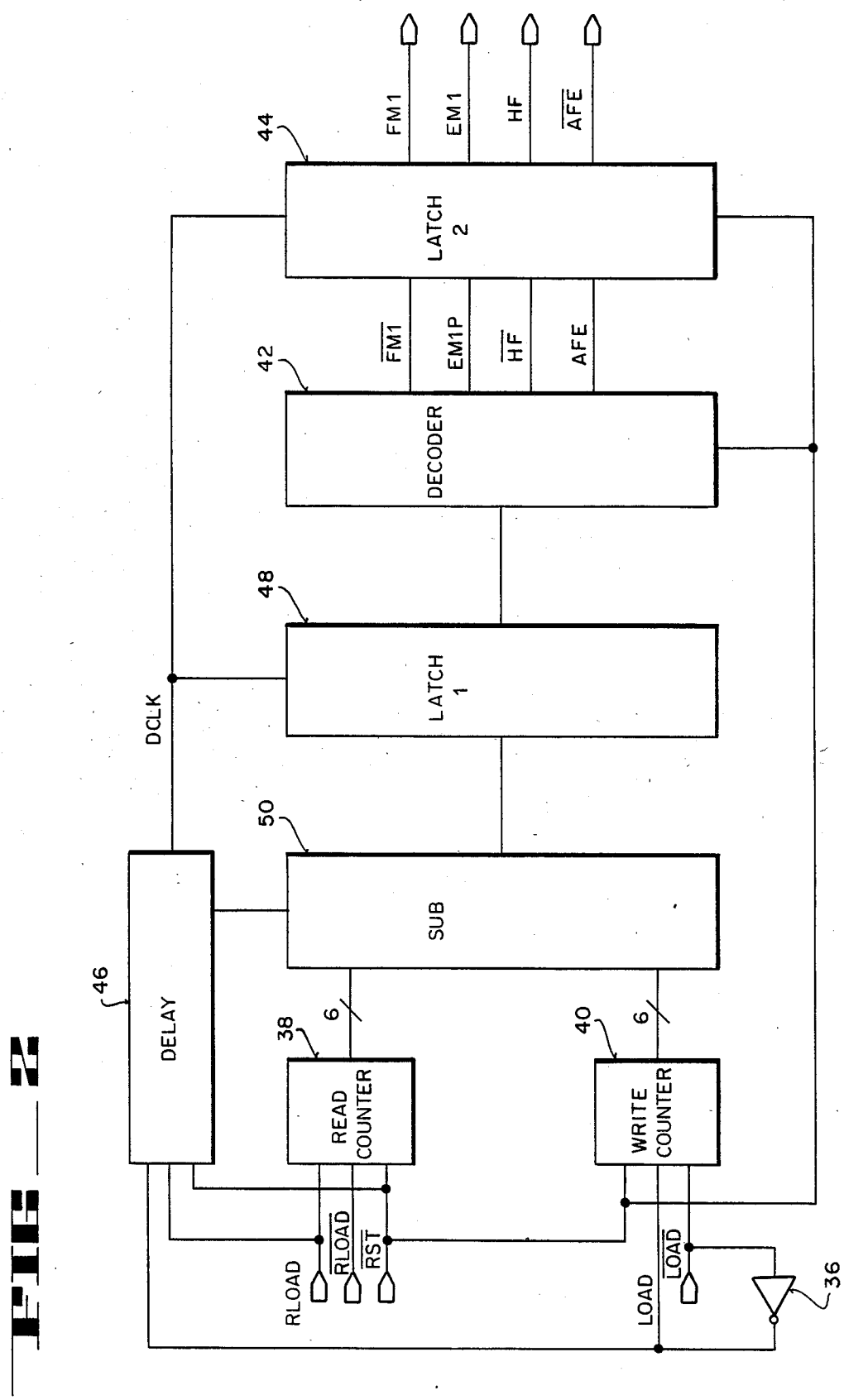
FIG_2

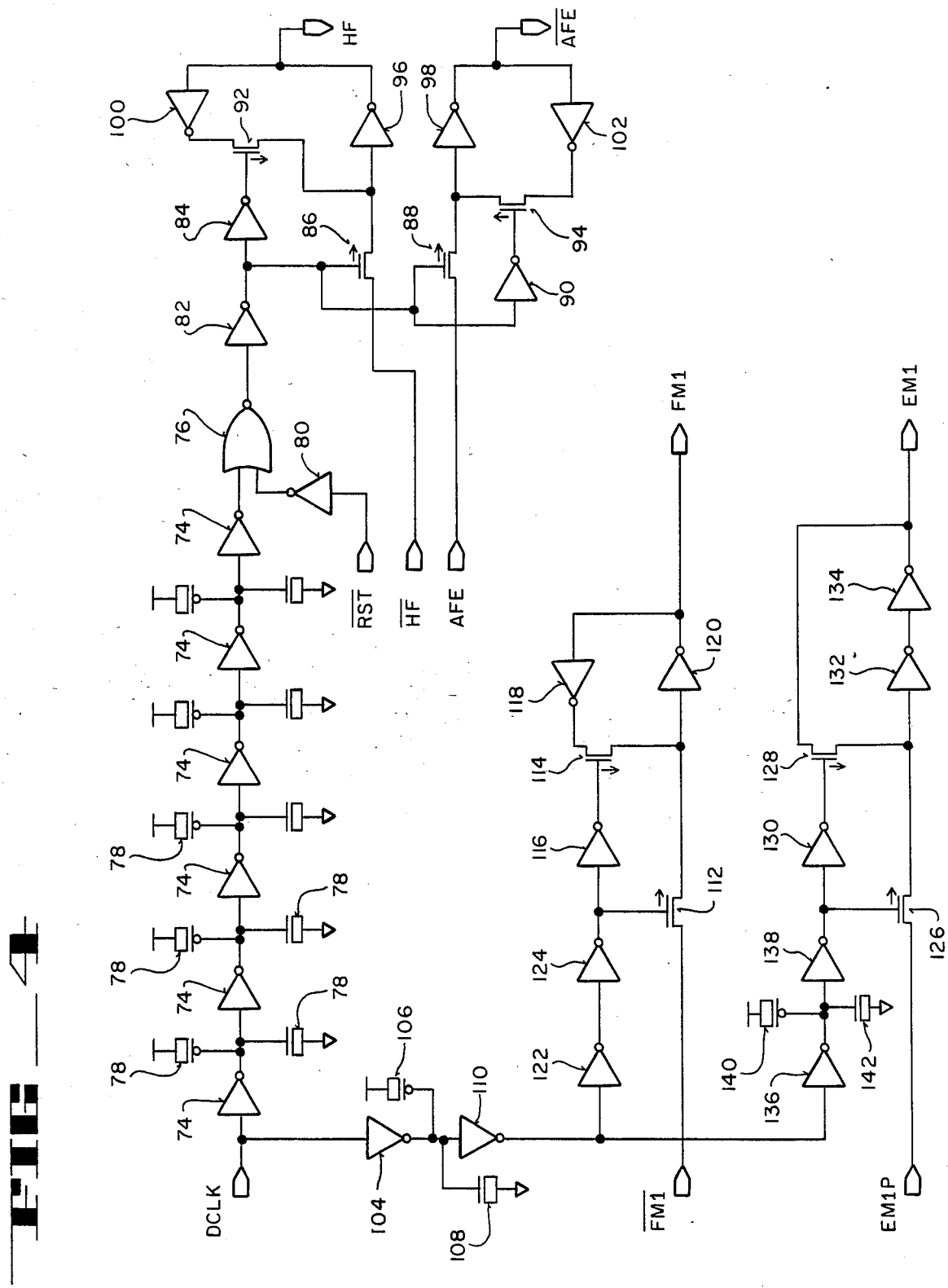
FIG_4

FIRST-IN FIRST-OUT BUFFER MEMORY WITH IMPROVED STATUS FLAGS

BACKGROUND OF THE INVENTION

1. Field of the Invention

The present invention relates to the field of first-in first-out (FIFO) buffer memories.

2. Prior Art

First-in first-out buffer memories are dual port memories having characteristics which are highly useful in various applications. In particular, such memories allow the writing of data to the memory and the reading of data from the memory simultaneously, and at independent rates limited only by the speed capability of the device in question. To prevent the overflow and loss of data when writing to the memory, and alternatively the reading of false data when reading the memory, full and empty flags are commonly provided by such memories to halt the writing and reading operations, respectively, until the condition giving rise to the flag has passed by the further reading from or writing to the memory, respectively. An example of this is the Full Flag $\overline{FF}$ and the Empty Flag $\overline{EF}$ of the MK4501, a 512 X 9 FIFO previously manufactured by Mostek. See also the article on this device entitled "FIFO—The Glue Holding Systems Together" starting on page 181 of the June 1983 issue of Computer Design magazine.

In certain applications however, the full and empty flags may not provide a system designed with the full flexibility needed, as it may be inconvenient, illogical, or even impossible to immediately stop the writing or reading sequences of the equipment connected to the FIFO buffer memory. Thus, for this purpose, it is desirable to have some additional flags to provide an indication of an almost full and almost empty status to provide a warning, whereby writing and reading operations may be more conveniently terminated or initiated as the case may be, before data loss or false data is obtained. Further, a half full flag is also useful to generally indicate the status of the memory to provide an even more advanced warning for write or read operations.

BRIEF SUMMARY OF THE INVENTION

A first-in first-out buffer memory with improved status flags to indicate not only memory empty and memory full conditions, but to further indicate conditions such as almost empty, almost full and half-full is disclosed. To generate the flags, counters continuously count the number of write and read operations, with a subtractor coupled thereto providing as an output the difference between the two counts. Time delay circuits initiated by write or read operations provide time delays sufficient to enable the counters and the subtractor to settle before clocking the result into a latch. The output of the latch is decoded, with a further time delay circuit clocking the decoder output thereinto to provide output signals for the foregoing status flags. The use of the time delay circuits and the clocking of status flags avoids any significant flag invalid time, making the flag signals constantly monitorable without regard to the timing of read and write operations.

BRIEF DESCRIPTION OF THE DRAWINGS

FIG. 1 is a block diagram of the first-in first-out buffer memory of the present invention.

FIG. 2 is a block diagram of the flag generator 34 of FIG. 1.

FIG. 3 is a simplified circuit schematic for the delay circuit 46 of FIG. 2.

FIG. 4 is a circuit diagram for the latch 44 of FIG. 2 and the time delay circuits associated therewith.

DETAILED DESCRIPTION OF THE INVENTION

First referring to FIG. 1, an overall block diagram of a preferred embodiment first-in first-out buffer memory of the present invention may be seen. The basic memory array 20, in this case a 64×9 memory array, is a dual port memory capable of being written to and read from simultaneously, whether synchronously or asynchronously. For writing to the memory the data bits D0 through D8 are presented to the write multiplexor 24 and written to the memory as directed by the write pointer 22 and as controlled by the control logic 26. When the memory is in condition to accept an additional input, the input ready signal IR will go high, the new data being read thereinto when the input device connected to the FIFO buffer memory pulls the shift in signal SI high. To read data out of the memory, the read multiplexer 28 reads the appropriate memory location as directed by the read pointer 30 under the control of the control logic 26. Here, when data is ready to be read, the output ready signal OR will go high, any time after which the output device connected to the FIFO buffer memory can cause data to be strobed therefrom by bringing the shift out signal SO high. Whenever the memory is empty the output ready signal OR will be held low indicating that fact, whereas when the memory is full, the input ready signal IR will be held low to similarly provide an indication thereof.

It will be noted from the foregoing that in effect a write operation cannot be initiated unless or until the input ready signal IR is high, and that a read operation cannot be initiated until the output ready signal OR is high. Consequently, once a write operation or a read operation has been properly initiated and is in process, temporarily invalid IR and/or OR signals will be of no effect, provided they settle to the valid state well within the operating cycle time of the device, to be properly read to initiate or inhibit further write and/or read operations, as the case may be. Consequently, these signals, each representing a single condition as a basis for inhibiting data input and output respectively, have been derived in the past from simple decoders operating continuously without strobes, latches, etc. In that regard, these signals as well as the master reset signal $\overline{MR}$ are well-known in the FIFO buffer memory art.

Also shown in FIG. 1 is a flag generator 34 which generates additional memory status flags, in this embodiment a half full flag HF and an almost full/empty flag $\overline{AFE}$. The half full flag HF, as its name implies, stays low whenever the memory has less than 32 bytes therein, and stays high if the memory has 32 or more bytes therein. Thus, for the 64 byte memory of the embodiment disclosed herein, the HF flag will be low if the memory contains zero to 31 bytes, and will be high if the memory contains 32 to 64 bytes. The almost full/empty flag $\overline{AFE}$, on the other hand, is used to indicate that the memory is approaching the full or empty condition, in the embodiment disclosed herein representing 56 or more bytes, or 8 or less bytes of information currently stored therein. Which of these two conditions exists, of course, can be determined from the HF flag, as a high state HF flag together with a high state $\overline{\text{AFE}}$ flag indicates that the memory is almost full, whereas a low HF flag with a high $\overline{\text{AFE}}$ flag will indicate that the memory is almost empty. Thus, the various states of the flags and the various associated memory conditions may be summarized as shown below.

| Memory Content | HF | AFE |
|---|---|---|
| 0–8 | 0 | 1 |
| 9–31 | 0 | 0 |
| 32–55 | 1 | 0 |
| 56–64 | 1 | 1 |

Since the IR and OR signal each only enable and disable a single memory function, these flags need only be valid some known time after the previous similar function was initiated. Actually, in the embodiments disclosed, the IR and OR signals, respectively, go low following the SI and SO signals, respectively, to indicate that the same have been responded to, returning to their proper state when the SI or SO signal goes low again. The HF and $\overline{\text{AFE}}$ flags, on the other hand, being intended to indicate memory status in the presence of asynchronous read and write operations, should be valid substantially continuously so that they can be monitored continuously, as their dependence on both asynchronous read and write operations would make it particularly inconvenient if a user of the FIFO buffer memory had to also consider the timing of the read and write operations to determine when these flags were valid. Accordingly, one of the primary purposes of the present invention is to provide additional flags such as the HF and $\overline{\text{AFE}}$ flags which are substantially continuously valid irrespective of the required flag generation times and the probable asynchronous nature of the read and write operations.

Now referring to FIG. 2, a block diagram of the flag generator 34 of FIG. 1 may be seen. This circuit has as its inputs, the read clock RLOAD and the inverse thereof, $\overline{\text{RLOAD}}$, and the inverse of the write clock, $\overline{\text{LOAD}}$, with the LOAD signal being generated within the circuit by inverter 36. Generated within this circuit are the half full flag HF and the almost full/empty flag $\overline{\text{AFE}}$, as well as a full flag FM1 and an empty flag EM1 which are used by the control 26 (FIG. 1) in the generation and/or inhibiting of the input ready flag IR and the output ready flag OR, respectively. Finally, also available in this circuit is the reset signal $\overline{\text{RST}}$, resetting various parts of the circuit upon command. In particular, on reset the read counter 38, the write counter 40, the decoder 42 and the latches 44 are reset. In that regard, as shall be subsequently described, decoder 42 is a random logic decoder whose decoded outputs merely follow the coded inputs thereto, though the reset signal is provided to the decoder to drive the output thereof to the reset condition to reduce the reset time thereof and to more quickly provide the appropriate output signals representing the reset condition to the input of the latch 44. In addition, the reset signal $\overline{\text{RST}}$ is coupled to the delay circuit 46 which, as shall subsequently be seen, is reflected in the delayed clock signal DCLK controlling latches 44 and 48, latch 44, as shall subsequently be seen, also having time delay circuits therein.

Upon reset, the read counter 38 in the preferred embodiment is reset to 63, and the write counter 40 is reset to zero. The outputs of these two counters are coupled to a subtractor 50 which provides a multiple bit output to latch 48 representing the difference in the two counts. This difference is latched into latch 48 by one or more delayed clock signals DCLK after the output of the subtractor 50 has had sufficient time to settle. The output of the latch 48 in turn is decoded by decoder 42, with the decoded outputs $\overline{\text{FM1}}$, EM1P, $\overline{\text{HF}}$ and AFE being latched into latch 44 containing its own time delay circuits, after the output of decoder 42 has had an opportunity to settle. Based on the foregoing, it may be seen that the outputs of the circuit of FIG. 2, FM1, EM1, HF and $\overline{\text{AFE}}$, remain in their last states until the delayed clock signal DCLK and further time delays in latch 44 cause the same to be updated in accordance with the change in the output of decoder 42, so that these output signals are isolated from the propagation times of the read counter, the write counter, the subtractor and decoder, having only a simple transition from a prior state to a new state upon the occurrence of the final clocking signal of latches 44. In that regard, note that in many of the read and write operations no change occurs in any of the output signals, the changes occurring in the embodiment disclosed only when the memory becomes full or empty, crosses the half full boundary in either direction, or crosses either of the almost full or empty boundaries in either direction.

Now referring to FIG. 3, a simplified circuit diagram of part of the delay circuit 46 of FIG. 2 may be seen. As shown in this figure, the LOAD signal is applied as one input of NAND gate 52 and is also passed through a delay circuit 54 and inverter 56 to provide the second input to NAND gate 52. Similarly the RLOAD signal is applied as one input to NAND gate 58 and is also passed through a delay circuit 60 and inverter 62 as the second input of the NAND gate 58. In that regard, in the preferred embodiment the delay circuits 54 and 60 are identical circuits of a type to be further described later. The outputs of NAND gates 52 and 58 are coupled as the inputs to NAND gate 64, the output of which is passed through an additional time delay circuit 66 to provide one input to NOR gate 68. The other input to NOR gate 68 is the reset signal resulting in the inversion of the $\overline{\text{RST}}$ signal by inverter 70. Finally, the output of NOR gate 68 is inverted by inverter 72 to provide the delayed clock signal DCLK.

The function of the circuit of FIG. 3 is to provide a delayed signal for clocking the latch 48 as soon as the output of subtractor 50 has had an opportunity to settle following a change in the read or write counters. For that purpose, the time delay circuit 66 has a delay substantially equal to the longest time delay for such settling (time delays for the settling after different changes will differ depending upon the specific change which is occurring) to assure that the difference count provided to the latch is valid before being latched into the latch. The time delays 54 and 60 on the other hand, define the width of the pulse DCLK clocking the latching. In particular, if both LOAD and RLOAD are low, at least one input to each of NAND gates 52 and 58 is low, making the outputs thereof high. This makes the output of NAND gate 64 low, and assuming $\overline{\text{RST}}$ is high (reset not occurring), the output of the time delay 66 will normally be low, making the output of NOR gate 68 high and the DCLK signal out of inverter 72 low. When LOAD goes high, the transition to inverter 56 is delayed by the delay circuit 54 so that the output of inverter 56 will remain high for the duration of the delay. The second input to NAND gate 52, being the directly connected LOAD signal, will of course go high immediately, driving the output of NAND gate 52 low for the period of delay 54. Thus, during the delay period of delay 54, the output of NAND gate 64 will go high, returning low again at the end of the delay of delay circuit 54. Thus, the output of NAND gate 64 is a pulse initiated by the LOAD signal, going high and terminating a short period thereafter in accordance with the delay time of delay circuit 54. Both the leading edges and trailing edges of the pulse are delayed by the delay circuit 66, so that the DCLK signal will be a pulse having a pulse width determined by the delay period of delay circuit 54, and starting a given time period after the LOAD signal goes high as determined by the time delay of time delay circuit 66. The circuit connected to the RLOAD signal of course performs in a similar manner in response to the RLOAD signal going high, so that the identical time delayed clock pulse DCLK will be generated for either load or RLOAD going high. If, on the other hand, one of these two signals goes high and then the other goes high within the time delay of time delay circuits 54 and 60, the resulting pulse DCLK will begin the appropriate time delay after the first signal goes high, but will be stretched in time up to a maximum of two times the delay of circuits 54 and 60. However, on the occurrence of a reset signal ($\overline{RST}$) going low, the DCLK signal is substantially immediately forced high, thereby allowing the difference in the reset values of the two counters to be latched into latch 48 (FIG. 2).

Now referring to FIG. 4, the details of the latch 44 and time delay circuits associated therewith may be seen. In this case, the actual circuit as opposed to a simplified circuit diagram is shown, both to provide specificity to a specific embodiment of the latch, and further, to provide circuit details exemplary of the techniques used in the time delay circuit 46. As shown in FIG. 4, the delayed clock signal DCLK is coupled through a series of inverters 74 to provide one input to NOR gate 76. Between each of the respective inverters 74 are field effect devices 78 coupled as capacitors to provide increased capacitive loading on the output of each except the last of the six inverters. Thus, the chain of inverters with capacitive loading on the outputs thereof form an additional time delay so that the corresponding input to NOR gate 76 is a further delayed DCLK signal. The other input to the NOR gate 76 is the reset signal, inverted by inverter 80 from the $\overline{RST}$ signal applied thereto. This reset signal as applied to the input to NOR gate 76 is normally low, so that the output of the NOR gate is normally a delayed inverse of the DCLK signal. Thus, the output of inverter 84 will be the inverse of the delayed signal.

The delayed DCLK signal on the output of inverter 82 is sufficiently delayed for the $\overline{HF}$ and the AFE signals to settle after any change thereof following the initiation of a read or write operation. This delayed DCLK signal on the output of inverter 82 then turns on field effect devices 86 and 88, with inverters 84 and 90 simultaneously cutting off field effect devices 92 and 94. This couples the $\overline{HF}$ and the AFE signals through field effect devices 86 and 88, respectively, and inverters 96 and 98, respectively, to drive the outputs HF and $\overline{AFE}$ to their proper current state. At the end of the delayed DCLK signal at the output of inverter 82, the gates of field effect devices 86 and 88 will go low, turning the devices off, and at the same time the gates of field effect devices 92 and 94 will go high, turning the same on. Since the input to inverter 100 is the signal HF, the output thereof is $\overline{HF}$, which is maintained as the input to inverter 96. Thus, the combination of the two inverters 96 and 100 act as a toggle or latch to hold the output HF so long as field effect device 92 is maintained on. Similarly, inverters 98 and 102 act as a latch to maintain the output signal $\overline{AFE}$ so long as field effect device 94 is maintained on. Thus it may be seen that the delayed DCLK signal, a pulse of very short duration, causes the latching of the new outputs for HF and $\overline{AFE}$ to provide the half full and almost full/empty flag outputs of the FIFO buffer memory.

The DCLK signal is also coupled through inverters 104 and 110, with field effect devices 106 and 108 providing some short time delay, to the latch circuits for the signals $\overline{FM1}$ and EM1P. The circuit comprising field effect devices 112 and 114 and inverters 116, 118, and 120 is the same as and functions the same as that provided by field effect devices 86 and 92 and inverters 84, 96 and 100, though of course inverting the $\overline{FM1}$ signal and latching the same for the FM1 output upon the coupling of the delayed DCLK signal through inverters 122 and 124. Similarly, field effect devices 126 and 128 and inverters 130, 132 and 134 function the same as field effect devices 112 and 114 and inverters 116, 120 and 118, though in this case the output is taken not from the output of inverter 132, but from the output of the inverter 134, so that the output EM1 is the non-inverted equivalent to input EM1P. Also in this case, the DCLK signal as delayed through inverters 104 and 110 by field effect devices 106 and 108, is further delayed through inverters 136 and 138 by field effect devices 140 and 142. As stated before, the signal FM1 indicating a memory full condition, and the signal EM1 indicating a memory empty condition, are signals used to generate or inhibit the input ready (IR) and output ready (OR) signals of the FIFO buffer memory within the control 26.

There has been described herein a FIFO buffer memory which includes flags such as memory full, memory empty, memory half full, and almost full/empty which signals remain valid until clocked to the next valid state irrespective of ongoing counter decoder and other transitions and intervening invalid states. Obviously while the generation of specific flags has been disclosed and described herein, it will be understood by those skilled in the art that other memory status conditions may be similarly generated as desired. Thus, while the present invention has been disclosed and described with respect to a preferred embodiment thereof it will be understood by those skilled in the art that various changes in form and detail may be made therein without departing from the spirit and scope of the invention.

We claim:

1. A FIFO buffer memory comprising:
a dual port memory array having a plurality of storage locations, said memory array including input means for writing data from at least one input terminal to said memory array for storage, and output means for reading data from said memory means and presenting said data on at least one output terminal;
control means coupled to said dual port memory array for receiving shift-in signals and causing data presented on said input terminal to be written into successive locations in said memory array in response thereto, and for receiving shift-out signals and causing data in successive locations in said memory to be presented on said output terminal on a first-in first-out basis, and;

flag generating means for generating at least one flag indicative of at least one memory content condition other than one of a full and an empty, said flag generating means including:

(a) counter means responsive to shift-in and shift-out signals to provide a counter means output representing the difference in the number of write and read operations performed in the memory array, (b) first delay means responsive to shift-in and shift-out signals to provide a first time delay signal delayed in time by an amount adequate to allow said counter means output of said counter means to settle to a new value after a shift-in or shift-out signal is coupled thereto, (c) first latch means couple to said counter means and said delay means, said first latch means being responsive to said first time delay signal to latch said output thereinto and to provide the same as a first latch means output, (d) decoder means coupled to said first latch means and responsive to the output thereof to provide a decoder means output indicative of at least one memory content condition other than one of a full and an empty, (e) second delay means responsive to shift-in and shift-out signals to provide at least one second time delay signal delayed in time with respect to said first time delay signal by an amount adequate to allow said decoder outputs to settle to a new values after a change in said first latch means output, and, (f) second latch means coupled to said decoder means and said second delay means to clock said decoder outputs into said latch responsive to said second delay means, whereby the data in said second latch means is substantially continuously indicative of at least one memory content condition other than one of a full and an empty.

2. The FIFO buffer memory of claim 1 wherein said first and second time delay means comprise means for simulating the longest settling time for said counter means and said decoder means respectively.

3. The FIFO buffer memory of claim 1 wherein said decoder means is responsive to the output of said first latch means to provide a decoder means output indicative of a plurality of memory content conditions other than one of a full and an empty.

4. The FIFO buffer memory of claim 3 wherein said plurality of memory content conditions include a memory half full condition.

5. The FIFO buffer memory of claim 3 wherein said plurality of memory content conditions include memory almost full and memory almost empty conditions.

6. The FIFO buffer memory of claim 1 wherein said first delay means is a means responsive to a shift-in signal followed shortly in time by a shift-out signal, or a shift-out signal followed shortly in time by a shift-in signal, to extend the delay in time of said first time delay signal as initiated by the first shift-in or shift-out signal by an amount adequate to allow said counter means to settle to a new value after the subsequent shift-out or shift-in signal.

7. The FIFO buffer memory of claim 6 wherein said second delay means is responsive to said shift-in and shift-out signal through said first delay means.

8. The FIFO buffer memory of claim 1 wherein said second delay means is responsive to said shift-in and shift-out signal through said first delay means.

* * * * *